Feb. 11, 1936.   J. A. MacLEAN   2,030,216
FLOOR CLIP
Filed April 4, 1935
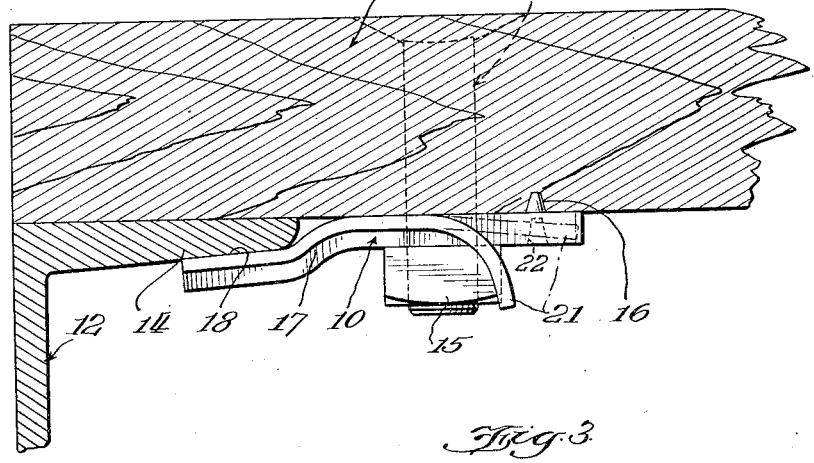
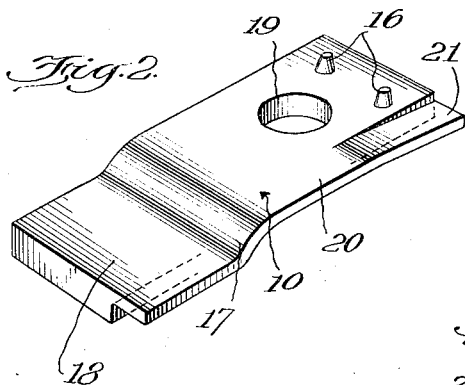
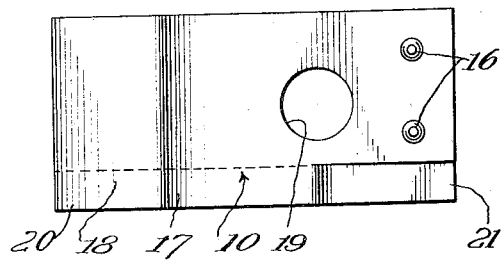
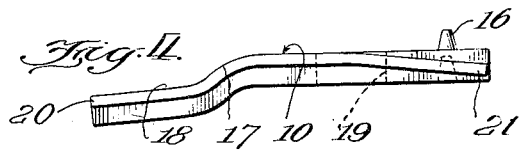
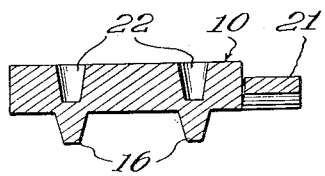
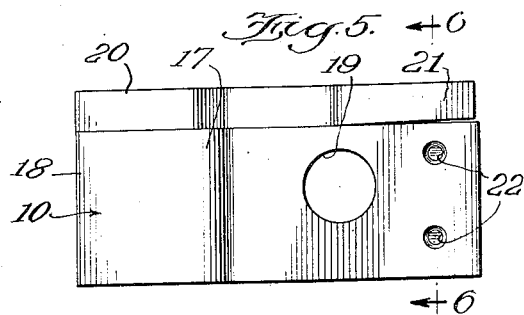
Inventor:
John A. MacLean
By
Williams, Bradbury, McCaleb & Hinkle
Attys.

Patented Feb. 11, 1936

2,030,216

UNITED STATES PATENT OFFICE 2,030,216

FLOOR CLIP

John A. MacLean, Chicago, Ill., assignor to Mac-Lean-Fogg Lock Nut Company, Chicago, Ill., a corporation of Illinois Application April 4, 1935, Serial No. 14,575

5 Claims. (Cl. 20—6)

The present invention relates to floor clips and is particularly concerned with improvements in the floor clips disclosed in my prior Patent No. 1,922,814, issued August 15, 1933, for a floor clip and method of making same. The floor clips in question are particularly adapted to be used for securing wooden floor boards or planks to a supporting structure of the steel beam type, such as is used in railway cars.

One of the objects of the present invention is the provision of an improved floor clip structure which is capable of being manufactured more economically having a minimum number of machine operations and using a minimum amount of material for securing the same amount of bearing surface so that the clip can be produced at a lower cost and placed within the means of a larger number of purchasers.

Another object of the invention is the provision of an improved floor clip structure especially adapted with respect to the character of its prong structure to be used on flooring of all different types, particularly hard wood flooring into which certain types of prongs can be inserted only with the application of considerable force. While the prongs of the type disclosed in my patent are perfectly capable of performing the functions desired and may be manufactured at a low cost, there is a tendency in the hardest type of flooring to cause a splitting although this tendency is not present at all in soft wood flooring.

One of the objects of the present invention is the provision of a prong structure which can be very easily forced into the desired position in even the hardest type of wood used in flooring and which has absolutely no tendency to cause splitting in the hardest woods when so used.

Another object of the invention is the provision of an improved structure involving a rearrangement and reversal of parts similar to those shown in my prior patent but by means of which the effectiveness of the clip is increased. By such a rearrangement the bearing surface may be increased and the nut locking prong may be so arranged by means of a simple shearing operation that it is in convenient position to permit insertion of a tool and yet located in the plane of the clip so that it does not, in this position, interfere with the rotation of the nut while the nut is being tightened on the bolt.

Other objects and advantages of the invention will be apparent from the following description and the accompanying drawing in which similar characters of reference indicate similar parts throughout the several views.

Referring to the single sheet of drawing,

Figure 1 is a transverse sectional view of a beam, flooring clip and bolt embodying the present invention;

Figure 2 is a view in perspective of the present improved floor clip;

Figure 3 is a top plan view of a floor clip;

Figure 4 is a side elevational view of the floor clip of Figure 2, showing the position of the nut locking flange before the flange has been bent to the position of Figure 1;

Figure 5 is a bottom plan view of the floor clip; and

Figure 6 is a transverse sectional view taken on the plane of the line 6—6 looking in the direction of the arrows and showing the prong structure and mode of formation of the prongs.

Referring to Figure 1, 10 indicates in its entirety the floor clip which is used to secure the flooring 11 to the beam 12 by means of the bolts 13. The beam 12 may comprise the side sill of a railway car which extends longitudinally thereof and usually comprises an I-beam or a U-beam having a horizontally disposed upper sill flange 14. A separate bolt 13 or a plurality of bolts and clips may be used for each board of the flooring, depending upon the width and the method of application of the clip to the flooring is substantially the same as described in my patent above mentioned.

The clip 10 is clamped to the board 11 by the nut 15 on the bolt 13 which draws the prongs 16 into the wood and prevents rotation of the clip 10. The clip 10 is formed with a suitable offset 17 so that the flange portion 18 of the clip engages below the beam flange 14 when the board 11 is drawn tightly against the top of the beam 12. Of course, the clip is provided with the aperture 19 of suitable size for the bolt 13.

Referring to my prior patent, in that device the flange 20 of reduced thickness at one side of the clip was formed on the lower edge of the clip, being spaced from the boards as shown in my patent. I have discovered that if this flange is formed on the upper side of the floor clip 10, the area of the clip between the offset 17 and hole 19 may be considerably increased thereby providing a better bearing surface against the wood with the use of the same amount of material or providing the same amount of bearing surface on both sides of the bolt with the use of a reduced amount of steel.

The bar of which the floor clip 10 is made may be hot-rolled to shape, with a flange 20 of reduced thickness, as shown; and in order to increase the bearing surface I prefer to arrange the flange 20 of reduced thickness on the upper side of the floor clip 10. The clips may then be cut off to appropriate length and simultaneously or in a different operation provided with the offset 17, and the hole 19 may be punched.

With the thin flange 20 of the clip arranged on the top side, the nut locking flange portion 21 may be formed or cut loose by a simple shearing operation, the tool acting from the top of the clip 10, as shown in Figs. 2 and 4, and tending to leave the nut locking flange 20 bent slightly downwardly, as shown in Figs. 2 and 4, and also shown in dotted lines in Fig. 1. This leaves the flange 21 still in the plane of the clip 10 but bent away from the board 11 sufficiently so that a screwdriver, a claw hammer or other suitable tool may be readily inserted under the flange 20 and below the board 11, and the flange 20 may be very quickly and easily bent downward to the position shown in full lines in Fig. 1 to lock the nut 15. This results in a considerable saving of time over any arrangement where the nut locking flange is in close engagement with the board so that it would involve any difficulty in the insertion of the bending tool.

I prefer, also, to form the prongs 16, which prevent rotation of the clip during the securing operation and afterwards, by a partial perforation method which results in the formation of a much smaller prong 16 capable of being forced into the very hardest woods that might be used for flooring without any possibility of splitting and without necessity for much hammering. A single hammer blow is sufficient to force the frusto-conical prongs 16 into the wood and this also saves time in the installation of the floor clips.

These prongs 16 are formed by the use of a perforating die which is so arranged that it goes into the apertures 22 only to the limit of extent shown in Figure 6 and during this operation the clip is, of course, supported by a suitable die complementary in shape to the prongs 16 and arranged on the lower side of the clip 10. The latter die is, of course, provided with apertures for permitting the discharge of oil, gas, etc., from the socket in the die which is intended to receive the prong 16.

The prongs 16 may thus be formed with a punching machine and this operation may be performed simultaneously with other punching or shearing operations on the clip 10 by means of suitable dies, thereby further reducing the cost of manufacturing the clip.

It will thus be observed that I have invented an improved form of my floor clip which involves a rearrangement and reorganization of the parts in such manner that they may be constructed more economically and applied more quickly and with less labor, thus decreasing the cost of the clip and the cost of installation of the floor.

While I have illustrated and described the floor clip and its various modifications associated with a floor construction applicable to a railway car, it is to be understood that my clip is applicable for use in securing the boards of a floor in various constructions. Neither do I wish to be limited to the exact structures as shown, as changes and modifications will readily suggest themselves and I therefore aim to cover all such changes as come within the spirit and scope of the appended claims.

What I claim and desire to secure by United States Letters Patent is:

1. In a floor clip for securing floors to structural frame members, an integral metal member having an attaching flange provided with an aperture for receiving a securing bolt to secure said member, a frame engaging flange carried by said clip, and an offset in said clip adjoining said attaching flange and frame engaging flange and bringing said frame engaging flange into a different plane whereby the flooring may be located on one side of the frame and the clip may engage the opposite side of the frame, said clip having an integral extension located on the side nearest the flooring and said extension being of reduced thickness whereby a portion of said extension may be bent downward to lock the nut of the bolt and the balance of said extension may be utilized for bearing against the wood of the flooring.

2. In a floor clip for securing floors to structural frame members, an integral metal member having an attaching flange provided with an aperture for receiving a securing bolt to secure said member, a frame engaging flange carried by said clip, and an offset in said clip adjoining said attaching flange and frame engaging flange and bringing said frame engaging flange into a different plane whereby the flooring may be located on one side of the frame and the clip may engage the opposite side of the frame, said clip having an integral extension located on the side nearest the flooring and said extension being of reduced thickness whereby a portion of said extension may be bent downward to lock the nut of the bolt and the balance of said extension may be utilized for bearing against the wood of the flooring, said extension being initially bent downward but still remaining between the planes divided by the upper and lower surfaces of the clip whereby a tool may be conveniently inserted between the extension and the flooring for bending the extension.

3. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent up into engagement with a nut on the securing bolt for securing the nut in predetermined position by engagement with the flat surfaces on the nut, said clip being provided with a prong extending upwardly from its upper surface for engagement in the wood of the flooring, said prong being formed out of a portion of the body of the clip, which portion is forced upwardly by deforming a part of the body within the boundary of the body.

4. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent up into engagement with a nut on the securing bolt for securing the nut in predetermined position by engagement with the flat surfaces on the nut, said integral extension of the clip being arranged at the side nearest the flooring, whereby the bearing surface of the clip against the flooring may be increased adjacent the securing bolt with the use of a minimum amount of material.

5. In a floor clip for securing floors to structural frame members, an integral metal member having an attaching flange and a retaining flange, said flanges being offset from each other, whereby said flanges are located in different planes so that the floor may be located on one side of the frame and the clip may engage the opposite side of the frame, said clip having an integral extension located on the side of the clip adjacent the floor to provide an increased bearing surface, and said extension being separated at one end from the body of said clip by a cut, forming a bendable portion, said bendable portion initially extending downward from the plane of the side of said attaching flange which is adjacent the floor, but still extending within the plane of the opposite side of said attaching flange, whereby a tool may be inserted under said bendable portion to bend it up to lock a nut, but the bendable portion is still in the plane of the clip and does not interfere with the rotation of the nut prior to its further bending.

JOHN A. MacLEAN.